United States Patent [19]

Guy

[11] Patent Number: 5,217,245

[45] Date of Patent: Jun. 8, 1993

[54] SWITCHABLE ROLL-STABILIZER BAR

[75] Inventor: Yoram Guy, Ann Arbor, Mich.

[73] Assignee: Monroe Auto Equipment Company, Monroe, Mich.

[21] Appl. No.: 754,396

[22] Filed: Sep. 3, 1991

[51] Int. Cl.$^5$ .......................................... B60G 21/055
[52] U.S. Cl. .................................... 280/689; 280/695;
280/723; 91/402; 91/357; 92/162 R
[58] Field of Search ............... 280/689, 692, 695, 723;
91/402, 357; 92/162 R, 166, 243; 277/205, 63

[56] References Cited

U.S. PATENT DOCUMENTS

| | | | |
|---|---|---|---|
| 2,140,733 | 12/1938 | Carroll | 92/244 |
| 2,825,610 | 3/1958 | Jakowchuk | 92/166 |
| 2,828,138 | 3/1958 | Brueder | 280/124 |
| 2,843,396 | 7/1958 | Lucien | 280/124 |
| 2,849,225 | 8/1958 | Lucien | 267/11 |
| 3,349,973 | 10/1967 | Smith | 277/205 |
| 3,473,330 | 10/1969 | Fritz | 92/162 R |
| 3,550,992 | 12/1970 | Grancon | 280/6 |
| 3,567,244 | 3/1971 | Hoffman et al. | 280/124 |
| 4,647,068 | 3/1987 | Asami et al. | 280/707 |
| 4,652,010 | 3/1987 | Sugasawa | 280/707 |
| 4,696,489 | 9/1987 | Fujishiro et al. | 280/707 |
| 4,768,627 | 9/1988 | Taylor | 277/205 |
| 4,834,419 | 5/1989 | Kozaki et al. | 280/707 |
| 4,973,077 | 11/1990 | Kuwayama et al. | 280/689 |
| 5,106,120 | 4/1992 | Di Maria | 280/689 |

FOREIGN PATENT DOCUMENTS

| | | |
|---|---|---|
| 0354113 | 2/1990 | European Pat. Off. . |
| 1138646 | 10/1962 | Fed. Rep. of Germany ...... 280/689 |
| 2303976 | 10/1976 | France ................................... 91/402 |
| 2006131 | 5/1979 | United Kingdom ................ 280/689 |

OTHER PUBLICATIONS

Pp. 184–187, Car Suspension and Handling, Second Edition, Donald Bastow, Pentech Press London, 1987.
Page from Ford Ranger and Bronco II (4×2) repair Manual (Apr. 1, 1931), believed published about 1978, showing removal and installation of front suspension.

*Primary Examiner*—Tamara L. Graysay
*Attorney, Agent, or Firm*—Harness, Dickey & Pierce

[57] ABSTRACT

Vehicle suspension apparatus operating between the sprung and unsprung masses of a vehicle includes a pendular anti-roll bar connected to the vehicle, and a pair of links which connect the bar to the wheels. One and the other link, respectively, is extensible and inextensible, with the extensible link comprising a selectively controllable hydraulic piston-cylinder assembly having first and second flow paths, and valve means which upon command automatically locks the piston at a midstroke position, depending on the flow of fluid in the passages. The flow paths allow the user to select either of two roll stiffness levels (i.e., high and low) and provide automatic convergence of the piston to its locked midstroke position (high roll stiffness hard ride) upon command.

14 Claims, 8 Drawing Sheets

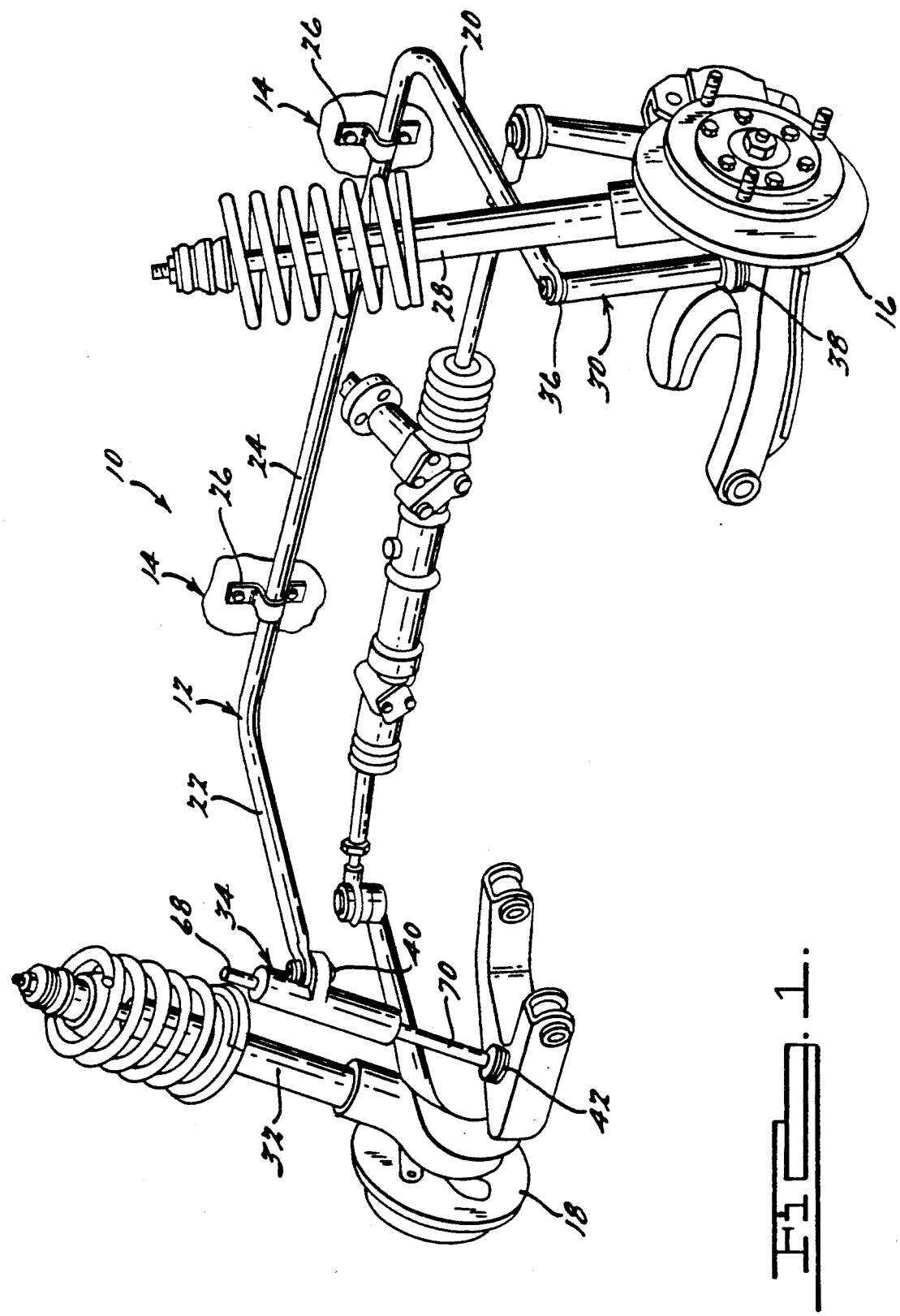

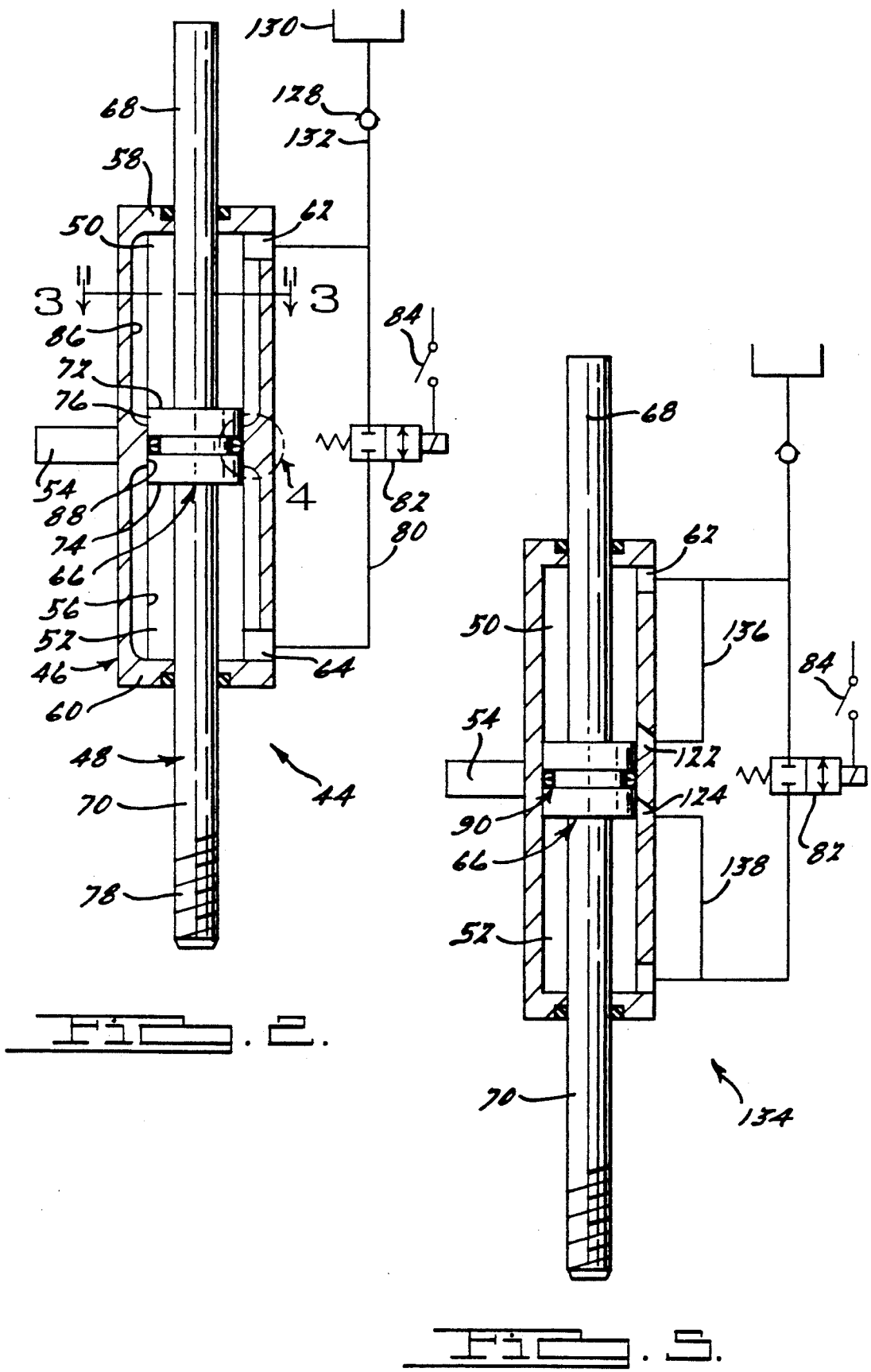

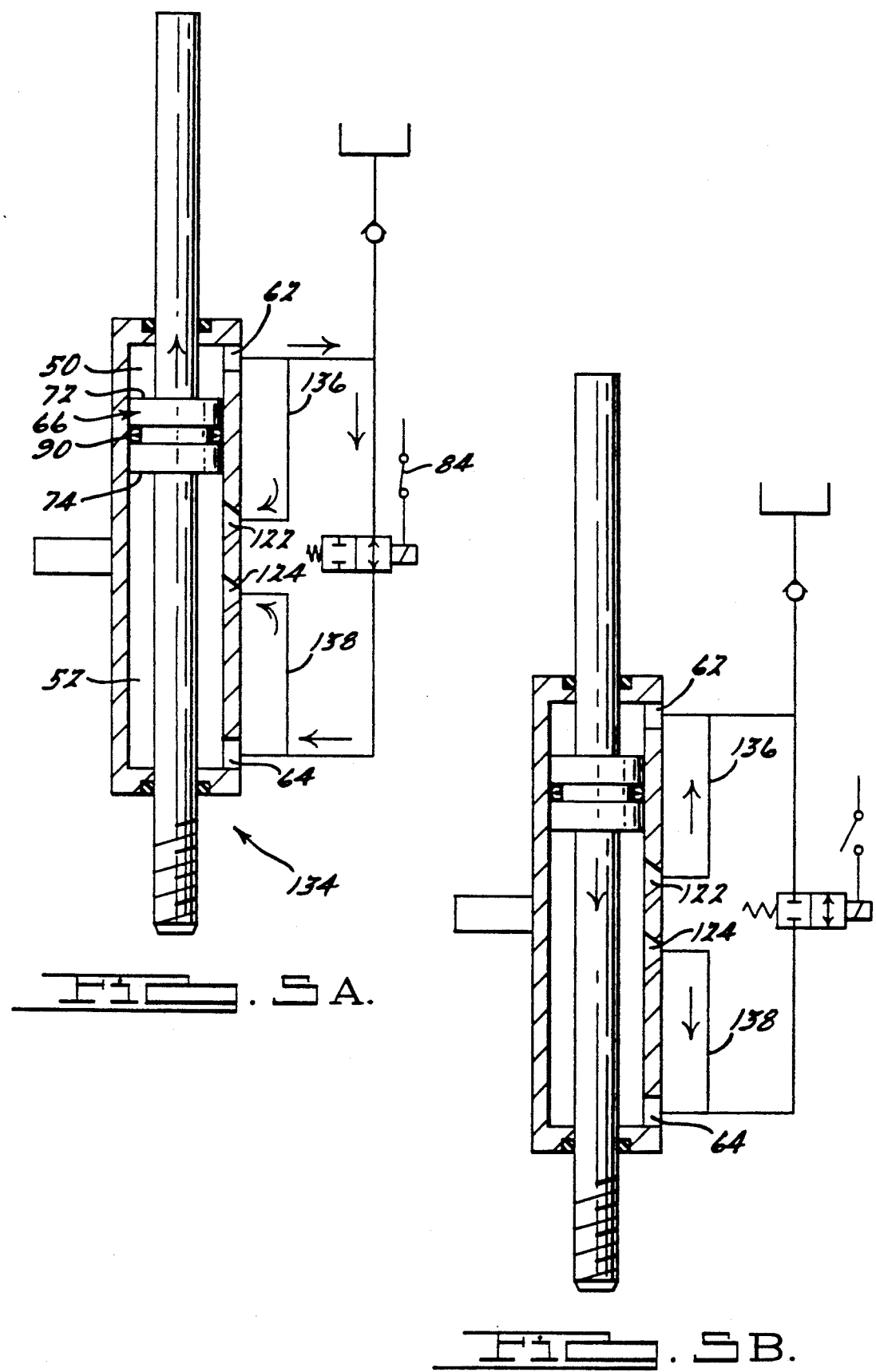

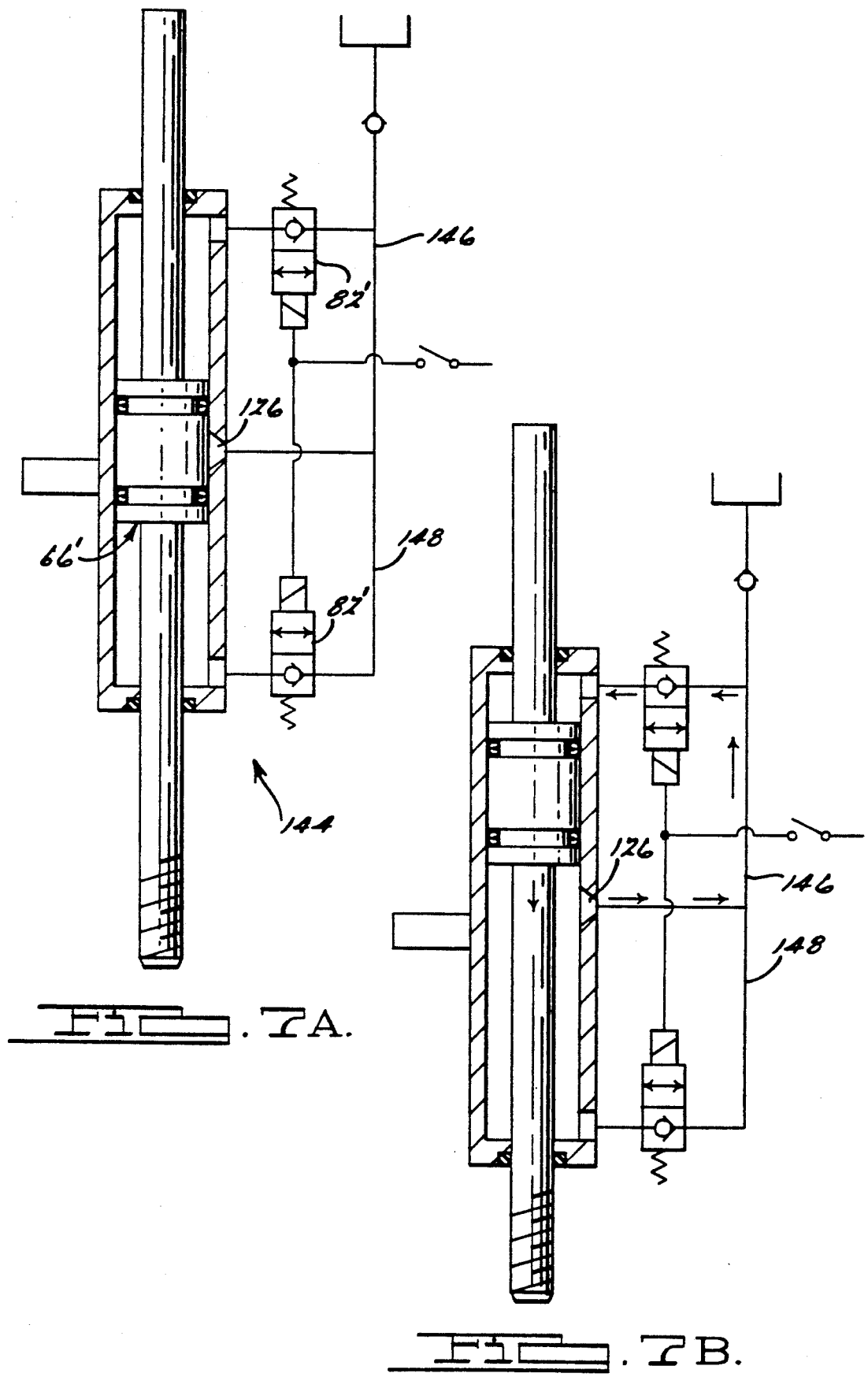

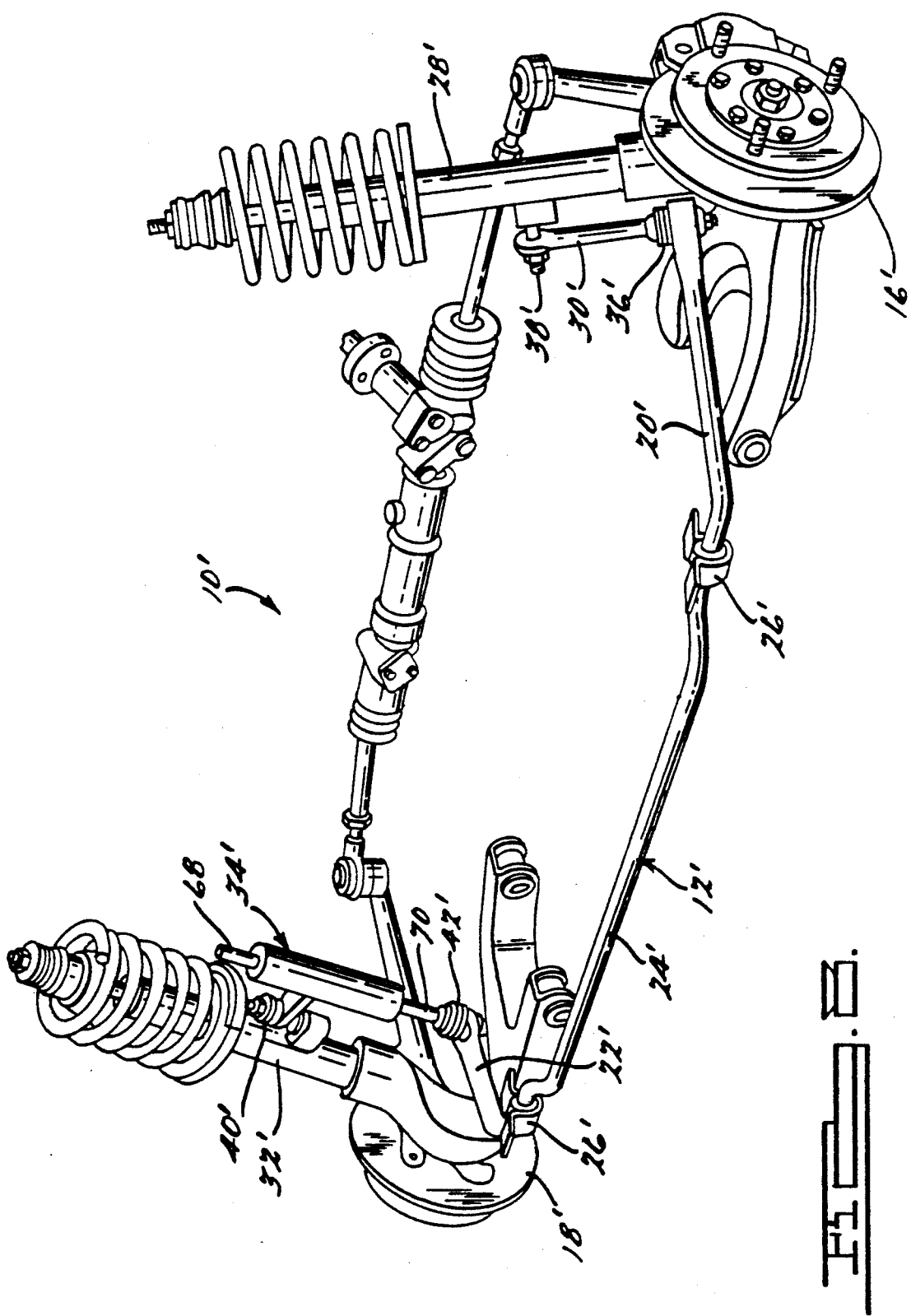

SWITCHABLE ROLL-STABILIZER BAR

BACKGROUND AND SUMMARY OF THE INVENTION

This invention is directed to an automotive suspension system and involves a piston-type apparatus for enabling a user to vary vehicle suspension roll stiffness, automatically or manually, between either of two predefined levels (with and without an anti-roll bar) whereby to control the ride and handling characteristics of the vehicle.

This invention provides vehicle suspension apparatus to achieve one or more of the following objectives. A primary objective in a multi-purpose vehicle can be to reduce roll stiffness from a nominal highway setting to a rough-road or off-road setting in order to improve rough-road and off-road ride comfort; improve off-road mobility; and improve vehicle durability by reducing rough-road and off-road induced structural stress. Another objective can be to increase roll stiffness in full payload condition in order to maintain more consistent ride and handling properties across wide range of payload variation. A third objective may be provision of apparatus by which the roll stiffness distribution between the front and rear suspensions can be adjusted statically or dynamically in order to modify or maintain handling characteristics.

In accordance with this invention, a suspension system for a motor vehicle comprises two largely vertical coupling links adapted to be connected between ends of an anti-roll bar which is pivoted on the vehicle chassis (i.e., the sprung mass) and respective road wheel suspension linkages at opposite sides of the vehicle (i.e., the unsprung masses), one coupling link being a conventional rigid tie rod and the other coupling link being a hydraulic piston and cylinder assembly, hereafter referred to as a hydraulic link. The rigid tie rod is axially inextensible and has its opposite ends pivotably connected, respectively, to one reaction end of a conventional torsional anti-roll bar and to the suspension linkage of one of the front wheels (i.e., a suitable reaction point on the suspension).

The hydraulic link is manually or automatically locked or allowed relative axial motion, and comprises a cylinder having opposite end walls and a port adjacent each end wall, and a piston carried by an actuator rod. The actuator rod comprises a first and second piston rod, each piston rod having its axis concentric with the cylinder axis and protruding from one respective end wall. The cylinder and one piston rod from the piston are connected, respectively, to the other reaction arm of the anti-roll bar and to the axle of the other wheel (or to a symmetrical reaction point, across the suspension) or vice versa. The piston rods are of equal cross-section and length. Hence, contrary to a shock absorber wherein the piston rod extends from one face of the piston, the swept, or displaced fluid volume per unit axial travel is the same on both sides of the piston.

Hydraulic switching to allow substantially incompressible fluid to flow from one port to the other port is preferably achieved by a normally closed solenoid valve or other remotely activated poppet valve(s). The operation is passive (no substantial power required). Further, should the valve be closed, for whatever reason, and the piston displaced from center, fluid by-pass arrangements are provided to allow the piston to stabilize (and be locked against further motion) centrally of the cylinder. In accordance with this invention, axial grooves on the inner wall of the cylinder, or other secondary fluid passages, are provided in order to allow the piston to center and automatically remain locked in this position.

Advantageously, the automotive suspension system herein provides an apparatus and method of varying suspension roll stiffness between a first harder suspension roll mode and a second softer suspension roll mode.

Advantageously, the suspension system herein will allow control of suspension roll stiffness for conditions during on-road and high speed driving wherein the hydraulic link is "locked", and during off-road and low speed conditions wherein the hydraulic link is "unlocked" for uncoupling the anti-roll bar from the suspension.

Advantageously, the hydraulic link apparatus herein will tend to return to a "piston locked" mode in the instantaneous zero roll position of the suspension after the manually or automatically controlled valve has disconnected the main flow path between the two sides of the piston.

The foregoing and other objects, and advantages, will become more apparent when viewed in light of the accompanying drawings and following detailed description wherein:

BRIEF DESCRIPTION OF THE DRAWINGS

FIG. 1 is a perspective view of a preferred embodiment of a vehicle suspension system according to this invention wherein a piston-cylinder type hydraulic link and rigid tie rod connect the ends of an anti-roll bar to the respective suspension linkage elements.

FIG. 2 is a longitudinal section view in accordance with one preferred embodiment of this invention showing a piston-cylinder type hydraulic link with a control valve, the control valve thereof being shown in its normally closed position whereby to lock the piston thereof in a centered and stabilized condition.

FIGS. 5, 5A and 5B are longitudinal section views in accordance with another preferred embodiment of this invention showing a piston-cylinder type hydraulic link with a control valve, the control valve thereof being shown in its closed and open positions and the piston shown, respectively, centered and displaced from center.

FIGS. 7A and 7B are longitudinal section views in accordance with another preferred embodiment of this invention showing a piston-cylinder type hydraulic link with a pair of simultaneously actuated control valves, the control valves thereof being shown in their closed position and the piston thereof shown, respectively, centered and displaced from center.

FIG. 8 is a perspective view of another embodiment of a vehicle suspension system according to this invention.

DETAILED DESCRIPTION OF THE PREFERRED EMBODIMENT

Figures 2A, 2B:
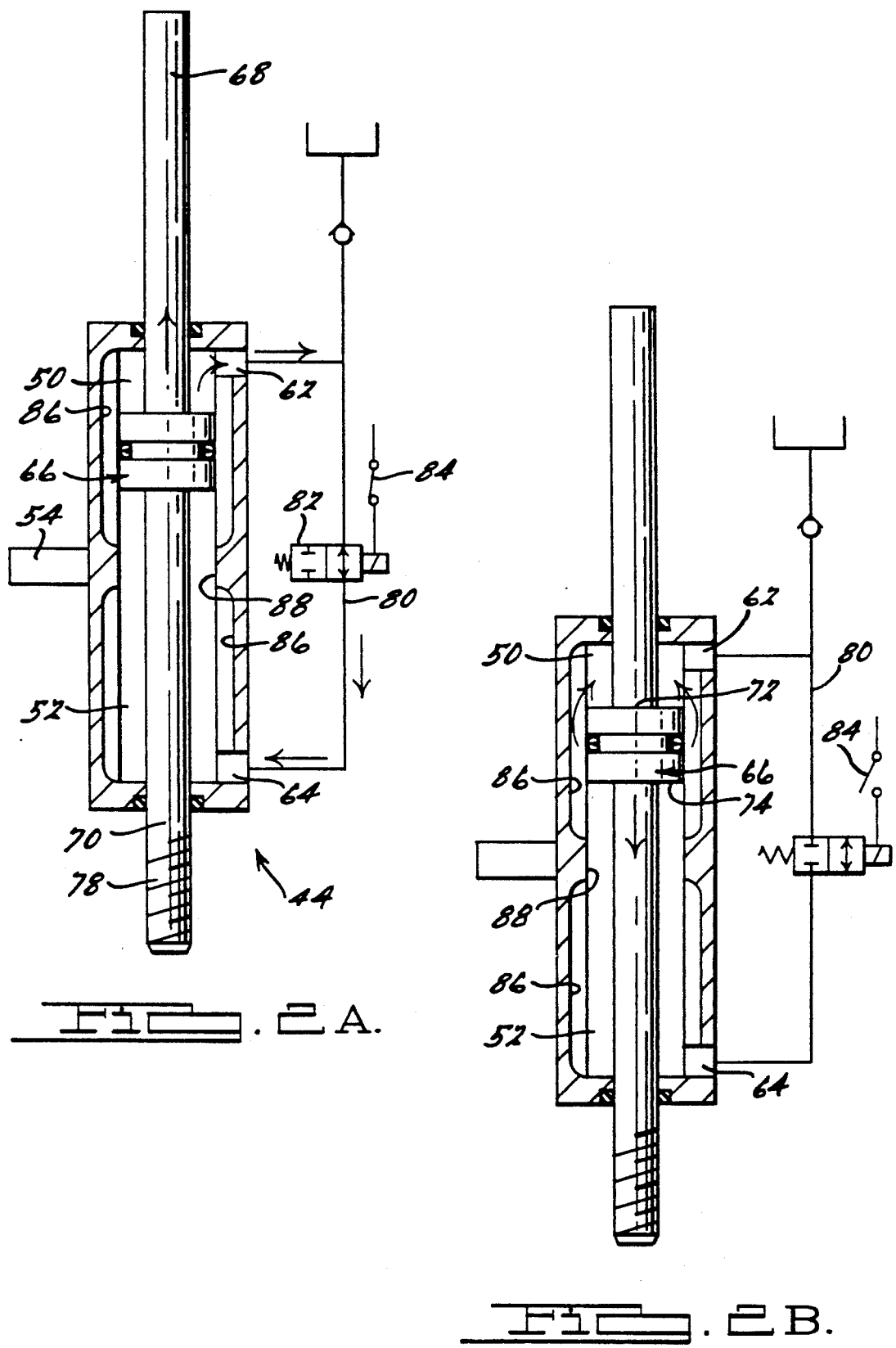
FIGS. 2A and 2B show the hydraulic link of FIG. 2 with the valve thereof, respectively, in its open and closed positions and when the piston thereof is displaced from its centered and stabilized position.
Figure 3:
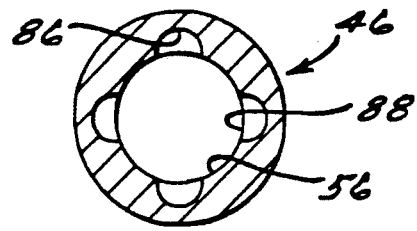
FIG. 3 is a cross-section taken along line 3—3 of the hydraulic link shown in FIG. 2.
Figure 4:
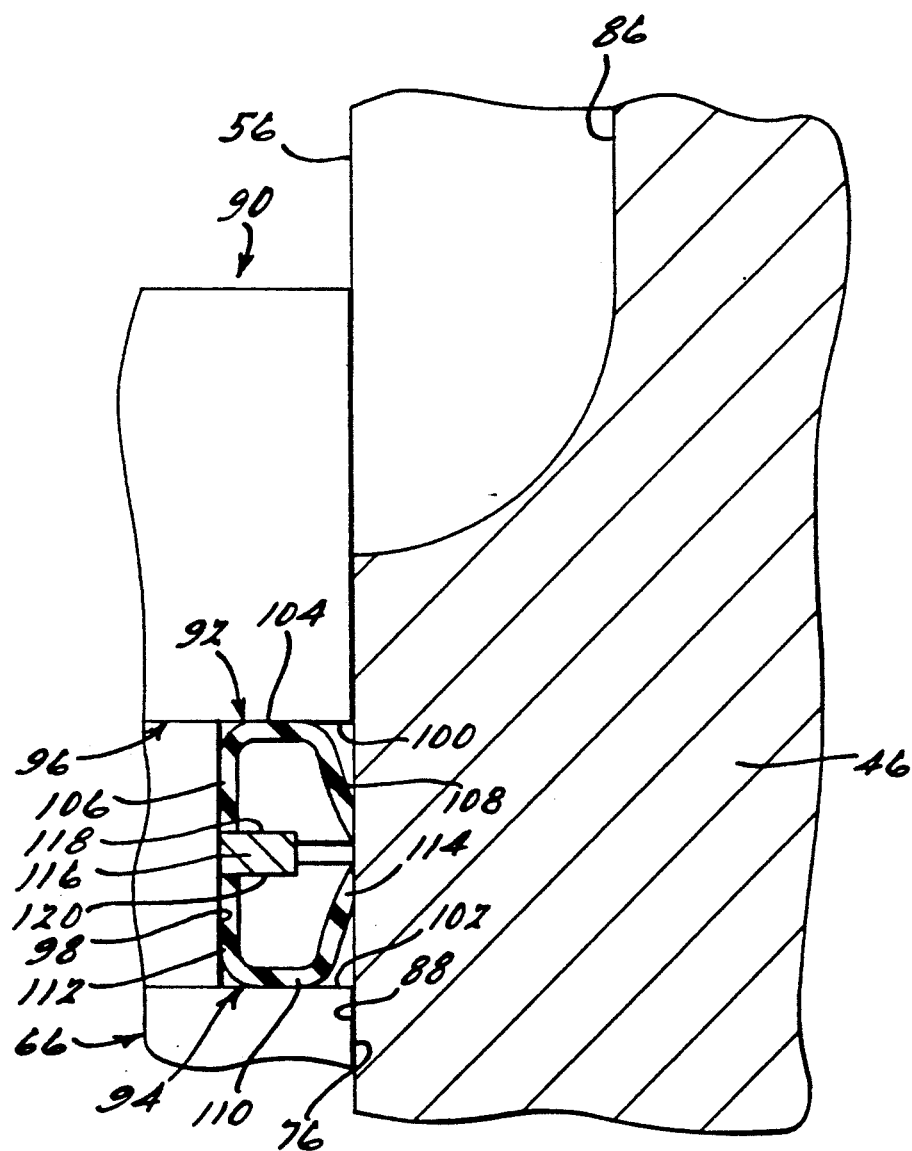
FIG. 4 is an enlarged view of a sealing arrangement taken with reference to the circle 4 of FIG. 2.

Turning now to the drawings, FIG. 1 shows various parts of a suspension system 10 of a vehicle, including an anti-roll bar 12 rigidly secured to the firewall 14 of the vehicle for coupling a vehicle frame (i.e., the sprung mass) with a pair of wheel assemblies 16 and 18 (i.e., the unsprung masses). The construction of a vehicle suspension is well-known to those skilled in the art and will be only briefly described herein. The description fits equally well to any automotive suspension assembly. The invention herein has application to both front and rear wheel vehicle suspension systems.

The anti-roll (or stabilizer) bar 12, which is bent as a "U", is disposed along the width of the vehicle and in a horizontal plane. Anti-roll bar 12 includes reaction arms 20 and 22 and is coupled at its central rod 24 to the firewall 14 (i.e., the sprung mass) by a pair of bushings 26 so that the rod 24 can rotate and twist torsionally about its axis and the respective ends of arms 20 and 22 will undergo vertical pendular movement. The end of reaction arm 20 of roll bar 12 is coupled to a suspension control arm or axle side 28 by a coupling link 30 and the end of reaction arm 22 of the stabilizer bar 12 is coupled to a suspension control arm or axle side 32 by a coupling link 34. Coupling link 30 is a conventional rigid tie rod or strut and is connected at pivots 36 and 38, respectively, to arms 20 and 28. Coupling link 34 is connected at pivots 40 and 42, respectively, to arms 22 and 32. Any vertical motion from suspension control arm or axle side 28 is transmitted directly to reaction arm 20 of the roll bar, and similarly at the other side.

In accordance with this invention, FIGS. 2-7 depict coupling link 34 as comprising a hydraulic piston and cylinder assembly (i.e., hydraulic link) for coupling or de-coupling between suspension control arm or axle side 28 and anti-roll stabilizer reaction arm 22, and providing an automatic hydromechanical synchronization of the anti-roll bar 12 engagement with the first instantaneous zero-roll condition of the suspension, in order to prevent steady-state roll offset. In all cases, the hydraulic link includes a hydraulic cylinder having a pair of axially spaced ends and a fluid port adjacent each end thereof, a solid piston mounted in the cylinder, a pair of like piston rods, each piston rod extending axially from opposite sides of the piston and protruding outside of the cylinder through a sealing bore at a respective cylinder end, and fluid control valves for hydraulically connecting or disconnecting the two fluid volumes at the two sides of the piston, thereby respectively enabling or blocking relative axial motion between the piston and the cylinder.

It is to be understood that instead of being connected to suspension control arm 28, as shown, without deviating from the disclosed concept, the left coupling link 30 and right hydraulic link 34 may connect between the anti-roll bar 12 and any other substantially unsprung suspension member such as an upper arm, a radius arm, a trailing arm, a semi-trailing arm, a swing-arm, an axle beam, a strut, or a wheel carrier. Also, it is completely arbitrary and immaterial whether the respective coupling link 30 and hydraulic piston/cylinder link 34 positions are reversed. Finally, while the lower piston rod is shown connected to a suspension member, and the cylinder to the anti-roll bar, reversal of these connections again does not alter the content or scope of this invention.

In accordance with a first embodiment of this invention, FIG. 2 shows hydraulic link 34 as comprising a hydraulic piston-cylinder assembly 44 which includes a cylinder 46 and piston assembly 48 which cooperate with each other to define two cylinder chambers 50 and 52. The pivot 40 is received in a flange 54 extending outwardly of the cylinder to connect to reaction arm 22 of stabilizer anti-roll bar 12. In the embodiment shown, cylinder 46 includes a cylindrical inner wall 56 that is substantially concentric with the cylinder axis, a pair of end walls 58 and 60 which close the opposite longitudinal ends of the cylinder, and a pair of ports 62 and 64 proximate to or within the respective cylinder end walls to allow hydraulic fluid to pass into or from the respective chambers 50 and 52.

Piston assembly 48 includes a solid piston 66 having axial faces 72 and 74 and a pair of piston rods 68 and 70, the piston being adapted to reciprocate axially back and forth in the cylinder, and the piston rods extending, respectively, generally perpendicularly from the piston faces 72 and 74. Piston 66 has an outer cylindrical wall 76 extending between the piston faces 72 and 74, the cylindrical wall being disposed in sliding sealed relation against inner wall 56. Piston rods 68 and 70 have their respective axes substantially in coaxial alignment with one another and with the cylinder axis and protrude through sealed apertures in respective end walls 58 and 60. As shown in this Figure, piston rod 70 is threaded at 78 to connect to the pivot 42 and connect the piston rod 70 to the suspension control arm 32.

An important feature of piston assembly 48 and cylinder 46 is that piston rods 68 and 70 are identical in cross-section. Provision of two like piston rods means that the piston area driving against the fluid is the same in both axial directions.

Fluid communication between chambers 50 and 52 is through ports 62 and 64 and via a fluid path 80 which passes fluid through a selectively controlled normally closed preferably remotely controlled valve 82. In FIGS. 2 and 2B, an "on-off" switch 84 is shown in an "open" position when no command signal is supplied to the valve, whereby the valve is "closed" and prevents fluid from passing between the chambers. In FIG. 2A, when a command signal is supplied to the solenoid, the valve 82 is "open," whereby fluid is allowed to flow through valve 82 and between the chambers 50 and 52. The valve could be actuated either due to a signal from an automatic control unit of the vehicle (not shown), or from a transducer generating a signal from vehicle operation (i.e., lateral acceleration signal), or the user desiring to manually modify roll resistance or vehicle attitude. The valve control signal itself could be electrical, hydraulic, pneumatic, or mechanical.

In accordance with this invention, inner wall 56 of the cylinder 46 includes a central cylindrical wall portion 88 and a plurality of axial bypass grooves 86. The grooves 86 are provided in the wall of the upper chamber 50 and in the wall of the lower chamber 52 and extend axially from first positions adjacent to the ports 62 and 64 to second positions adjacent to the central wall portion 88. The central wall portion 88 is non-grooved and defines the midstroke position of the piston and encircles the piston wall 76 when the piston 66 is at the midstroke position. Without the axial grooves 86, the solid piston 66 is "locked" at any position of its travel when the valve is closed. The bypass grooves 86 permit oil to flow axially, within the cylinder cavity, between the upper and lower chambers 50 and 52 when the piston is displaced from its midstroke position, and permit the piston to move axially back and forth until reaching the midstroke position where an instantaneous condition of zero roll is achieved. As a result, further motion of the piston is hindered and the anti-roll bar is engaged for increasing the rolling resistance of the spring mass.

When the valve is "open" so as to permit oil to flow through ports 62 and 64 and between chambers 50 and 52, piston 66 can be moved with minimal restriction in cylinder 46, thereby "disconnecting" the anti-roll bar.

As shown in FIG. 2, the switch 84 is in the "open" position, the control valve 82 is "closed" and the piston is "locked" at its nominal midstroke position by the non-grooved central wall 88. This condition could be for a smooth road and high speed. As shown in FIG. 2A, as an example in the case of an electrical command signal, the switch 84 is "closed" and control valve 82 is energized, whereby the valve is "opened" and fluid permitted to pass between chambers 50 and 52. The piston is shown advancing upwardly into chamber 50. As shown in FIG. 2B, if the switcn 84 is then "opened," the control valve is then "closed" and no fluid can pass through the valve and between the chambers. However, bypass grooves 86 allow piston 66 to continue to move, as a result of fluid passing axially around the piston through the grooves (as shown by the arrows), until the piston reaches its midstroke position.

Further and in accordance with this invention, a dynamic seal arrangement 90 operates between piston 66 and inner wall 56 of cylinder 46. While shown best by reference to FIG. 4, a pair of annular elastomeric seals 92 and 94 of "C" shaped cross-section are received in an annular groove 96 provided in cylindrical wall 76 of piston 66. Annular groove 96 is defined by a cylindrical wall 98 inwardly of outer wall 76 and a pair of annular faces 100 and 102 facing in opposite axial directions. Preferably, seals 92 and 94 each have the same (or substantially the same) cross-section and each are mounted as mirror images in groove 96 such that the "C's" open and face one another. Seal 92 includes a medial wall 104 adapted to abut against axial face 100, a cylindrical wall 106 adapted to abut the inner cylindrical wall 98 of groove 96, and a cylindrical wall 108 adapted to face outwardly and having a free end or lip which is adapted to resiliently engage inner cylindrical wall 56 of the cylinder. Similarly, seal 94 includes a medial wall 110 adapted to abut against axial face 102, and a pair of cylindrical walls 112 and 114 to engage, respectively, walls 98 and 56. An axial spacer ring 116 having faces 118 and 120 is positioned in the groove such that faces 118 and 120 are abutted against the free ends of the inner walls 106 and 112 whereby to retain the seals 92 and 94 in position relative to one another.

The dual seal 92 and 94 arrangement ensures consistent locking of the piston in its midstroke position, and consistent sealing when the pressure differential across the piston reverses direction. The dual seals allow piston 66 to "retreat" slightly Without entering into the fluid bypass grooves 86 (or bypass ports 122 and 124 in FIG. 5, or bypass port 126 in FIG. 7) and thereby breaking the sealing condition upon reversal of the direction of differential pressure across the piston after its motion was first blocked by the seal (nearest the low pressure side) reaching past the fluid bypass groove. Whenever a pressure differential exists across the piston, the seal nearer to the lower pressure side assumes the sealing function, due to the inward orientation of the lips of the two seals.

In operation, no flow is possible through control valve 82 when the "normally closed" valve is not energized. If piston 66 is at midstroke, the nongrooved portion 88 of cylinder wall 56 and wall 76 of piston 66 are facing, and the seal arrangement 90 prevents any axial movement of the piston assembly 48 (i.e., piston 66 is locked). However, if piston 66 is off-center of its midstroke position relative to the cylinder, piston motion is still possible since bypass flow is possible around the piston through the internal bypass grooves 86. As soon as suspension motion due to road inputs or maneuvers brings the piston seal to the midstroke position, namely, into the non-grooved area of the cylinder, any further oil flow will be disabled and further motion of the piston relative to the cylinder will be prevented.

When valve 82 is energized, the valve is in its "open" position and a fluid flow path is established through ports 62 and 64 and between the two fluid chambers 50 and 52 on either side of piston 66. This path enables any displaced volume of fluid from the chamber on one side of piston 66 to flow through the valve and fill an equal volume made available in the chamber on the other side of the piston. The net swept volumes on either side of the piston 66 are equal, therefore the amount of fluid displaced out of chamber 50 through port 62 at one end by movement of the piston 66 relative to the cylinder 46 equals the volume increment into chamber 52 through port 64 on the other side of the piston.

To assure adequate oil and no aeration in the hydraulic cylinder, a check valve 128 is provided to supply oil as needed from a reservoir 130. Valve 128 allows oil to flow in a direction only from reservoir 130 to path 80, but not from path 132 to reservoir 130. Reservoir 130 may be vented to atmospheric pressure, or it may be pressurized by way of a gas chamber, or by spring load, as is common in pressurizing automotive dampers.

In accordance with a second embodiment of this invention, FIGS. 5, 5A and 5B show a hydraulic link 34 in the form of a hydraulic piston-cylinder assembly 134, which is similar to the piston-cylinder assembly 44, but replaces the axial bypass grooves 86 with two external bypass lines 136 and 138 and with two additional closely and axially spaced center ports 122 and 124 in the cylinder. Bypass lines 136 and 138 function similarly as the bypass grooves 86. In FIG. 5, the switch 84 is in the "open" position, the valve 82 is in the "closed" position, and the piston 66 is locked at its midstroke position between ports 122 and 124. As shown in FIG. 5A, if the valve 82 is then energized (i.e., "open" ) the piston 66 can rise because fluid is passed from port 62 of chamber 50 into port 64 of chamber 52 and partly through line 136 and port 122 on the other side of the piston. As shown in FIG. 5B, if the valve 82 is then closed (i.e., deactivated), flow through, the valve 82 is prevented but piston movement is permitted because fluid passes through port 122 and along path 136 through port 62 on the other side of piston 66. The operation would be similar for a downward position of piston 66 below port 124 (instead of above port 122).

Sealing arrangement 90 cooperates in piston-cylinder assembly 134 to lock the piston at midstroke. The dual seal arrangement advantageously assures that should one of the seals 92 and 94 be positioned adjacent a port 122 or 124, the other seal will perform the requisite sealing function to lock the piston at midstroke.

Figures 6A, 6B:
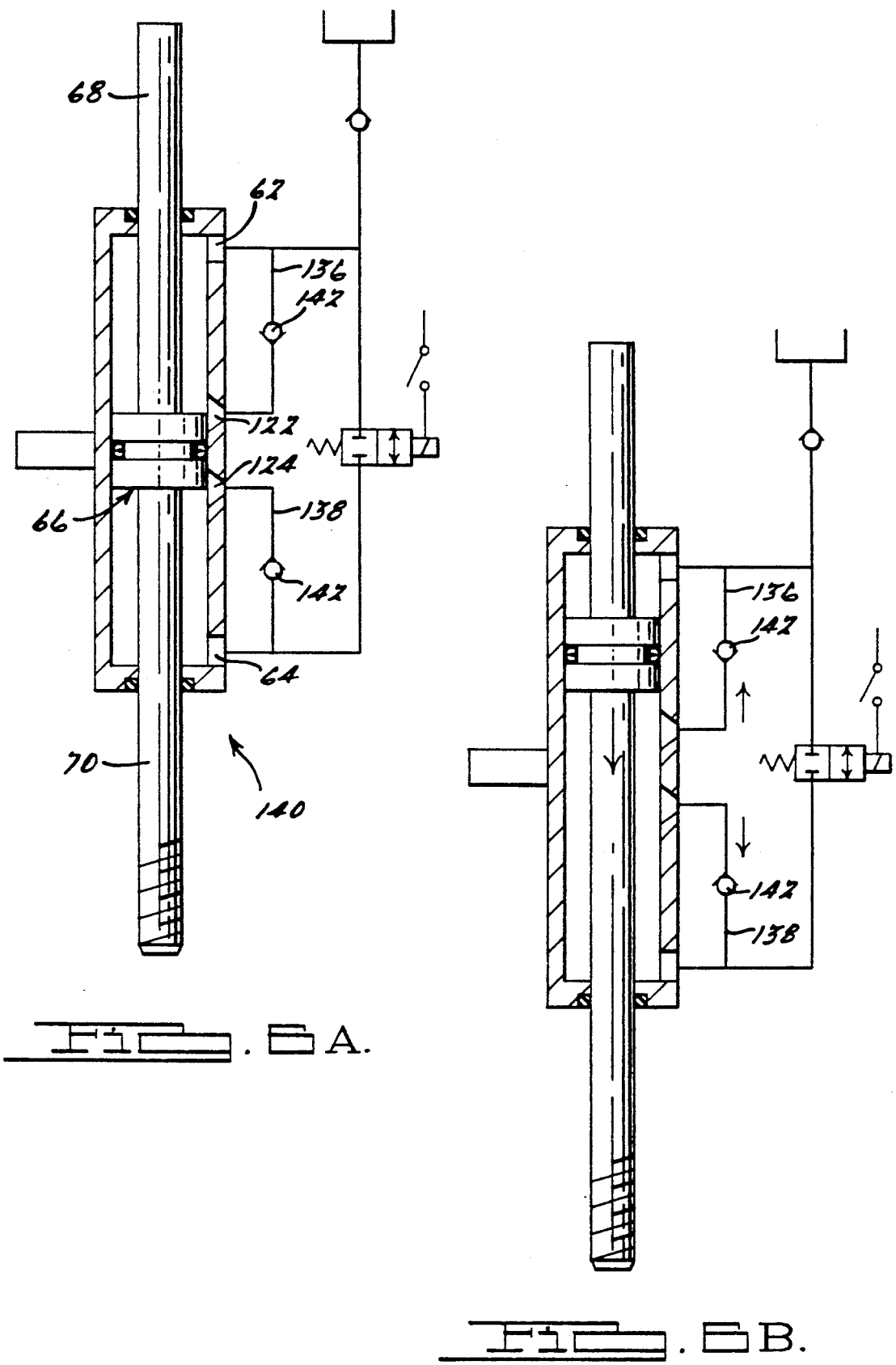
FIGS. 6A and 6B are longitudinal section views in accordance with another preferred embodiment of this invention showing a piston-cylinder type hydraulic link with a control valve, the control valve thereof being shown in its closed position and the piston shown, respectively, centered and displaced from center.

In accordance with another embodiment of this invention, FIGS. 6A and 6B show a hydraulic link 34 in the form of a hydraulic piston cylinder assembly 140 which is identical to the piston-cylinder assembly 134 except for the addition of a check valve 142 in each respective bypass line 136 and 138. In FIG. 6A, the piston is locked at midstroke. As illustrated in FIG. 6B, valve 82 is closed but the piston can move only back towards midstroke due to fluid bypass through the lines 136 and 138. The check valves serve to prevent the piston from moving away from the target center position after the instant the stabilizer has been "commanded" electrically, but before the hydraulic link of the anti-roll bar has been axially locked.

FIGS. 7A and 7B show a hydraulic link 34 in the form of a hydraulic piston-cylinder assembly 144 which provides the above automatic hydromechanical self-centering feature by external flow loops 146 and 148 sharing a center port 126 located in the cylinder at the midstroke position of a piston 66. Additionally, piston-cylinder assembly 144 utilizes two axially displaced piston seal assemblies 90 and two concurrently energized two-position open/check valve units 82', one in each flow loop, each enabling unrestricted flow into the cylinder in either valve position. Hydraulic piston-cylinder assembly 144 provides the same accelerated "convergence" to the "zero-roll" position as piston-cylinder 140. When the two control valves are deenergized (they are always controlled simultaneously and identically), they switch from being open passages to check valves, allowing only inlet flows through the cylinder end ports.

The hydraulic links 34 described herein have the desirable features of being simple, utilizing few but the least expensive hydraulic valves, and having advantageous overall packaging. In particular, hydraulic link 44 eliminates need for manufacturing internal grooves by utilizing separate bypass lines, and could be cost effective where space is available. Additionally, hydraulic link 140 improves system performance by accelerating the convergence to the central locked position with a slightly increased complexity and cost of two additional check valves. Hydraulic link 144 provides equivalent performance to hydraulic link 44 but trades off one simple control valve, two, check valves, four cylinder ports, and a single seal piston 66—for two slightly more complex control valves, three ports and a dual seal piston 66'. The reduced number of ports is accompanied by a considerable simplification of the plumbing.

It is envisioned, that in a practical automotive implementation of any of the above embodiments, the external hydraulic circuits and valves 128, 82, and 142, shown schematically in FIGS. 2 through 7 as located outside of the cylinder, could actually be incorporated into or within the cylinder body as one assembly, with appropriate manifolding cast or machined in the cylinder. The only exception would be the replenishing check valve 128 and the serviceable reservoir 130 (which would include a strainer), if vented, both of which are envisioned to be mounted as a unit to the chassis/body of the vehicle, and connected to the cylinder assembly via a flexible hose—in a precisely analogous fashion to an automotive brake line. If the reservoir is pressurized, it can be contained in the unit with the hydraulic link.

Now turning to FIG. 8, it is shown that the anti-roll bar 12 can be configured in different arrangements and can be secured to different parts of the vehicle. In FIG. 8, like reference parts to that of FIG. 1 are shown as being primed, and generally operate in an identical fashion. In the embodiment of this figure, coupling links 30' and 34' are connected to the wheel assemblies 16' and 18' at one end and to anti-roll bar 12' at opposite ends. Anti-roll bar 12' is rigidly secured to the vehicle 10' by means of bushings 26', as shown.

While the above description constitutes several preferred embodiments of the invention, it will be appreciated that the invention is susceptible to modification, variation, and change without departing from the proper scope or fair meaning of the accompanying claims.

What is claimed is:

1. In a vehicle suspension system of the type including a frame, first and second wheel assemblies connected to the frame, a pendular U-shaped roll bar having a central section rotatably mounted to the frame and first and second reaction arms associated with a respective wheel assembly, a rigid and axially inextensible link connecting the first wheel assembly with the first reaction arm, and an axially extensible second link connecting the second wheel assembly with the second reaction arm, said second link including a piston mounted for axial reciprocating movement with the bore of a cylinder having axially spaced end closures and dividing said cylinder bore into upper and lower chambers, the improvement comprising:

selectively operable valve means for permitting and preventing fluid to communicate between the chambers;

locking means for hydraulically locking said piston at a preselected position between the end closure walls of said cylinder and when said valve means is in said flow preventing position; and bypass means, operative independently of said valve means and when said piston has been displaced from said one preselected position, for permitting said piston to return to said preselected position when said valve means is in said flow preventing position, said bypass means comprising first and second axial grooves being formed in the interior wall of said cylinder, said grooves being axially spaced and located to extend axially from opposite sides of said piston when said piston is in said preselected position, whereby when said piston is displaced from said preselected position and would be otherwise locked if said valve means is in said flow preventing position, fluid can axially pass around the piston and between the chambers via the grooves when said valve means is in said flow preventing position.

2. The invention as recited in claim 1, said piston comprising a solid piston body having opposite axial faces incompressible fluid in each chamber, the areas of said piston, an annular periphery having substantially the same cross-section as the inner wall of the bore, and acutating means for driving the piston assembly relative to the opposite end walls of the cylinder; and seal means for preventing fluid passage between said periphery and said inner wall during reciprocation of said piston assembly.

3. The invention as recited in claim 2, wherein said piston comprises first and second piston rods extending axially from the opposite axial faces of the piston and protruding through one and the other of the respective end closure walls, said first piston rod being connected to its associated wheel assembly, and further comprising connector means for connecting the cylinder to its associated reaction arm.

4. The invention as recited in claim 3, wherein said valve means further includes manually or automatically remotely controlled signal means for actuating the valve means and permitting and preventing fluid flow.

5. The invention as recited in claim 1 wherein said locking means comprises an annular axially extending portion of the bore wall at said preselected location and the outer periphery of the piston being substantially smooth and continuous, and sealing means for preventing fluid passage between the bore wall and the outer periphery of the piston when the piston is at said preselected location.

6. The invention as recited in claim 5, wherein said sealing means comprises a pair of annular seals of elastomeric material and of C-shaped cross-section being disposed in an annular groove of the piston body and in facing relation.

7. The invention as recited in claim 1, wherein said axial links are operatively connected with the wheel assemblies at a front of said vehicle.

8. The invention as recited in claim 1, wherein said axial links are operatively connected with the wheel assemblies at a rear of said vehicle.

9. In a vehicle suspension system of the type including a frame, first and second wheel assemblies connected to the vehicle frame, a pendular U-shaped roll bar having a central section rotatably mounted to the frame and first and second reaction arms associated with a respective wheel assembly, and first and second links, respectively, connecting each respective wheel assembly with its associated reaction arm, said first link being rigid and axially inextensible, and said second link being a piston assembly including a piston mounted for axial reciprocating movement within the bore of a cylinder having axially spaced upper and lower end closure walls and dividing the bore into upper and lower chambers, the improvement comprising:
  control valve means, including a first and second remotely actuated control valve configured for substantially simultaneous opening and closing operation, for permitting and preventing fluid to communicate between the chambers;
  locking means for hydraulically locking said piston at a preselected position between the end closure walls of said cylinder and when said valve means is in said flow preventing position; and
  bypass means, operative when the control valves are in the flow preventing position and said piston has been displaced from said preselected position, for permitting said piston to return to said preselected position, said bypass means including a fluid port located in the wall of said cylinder at said preselected position and adapted to communicate fluid from said bore when said piston is displaced from said preselected position, a bypass passage connecting said fluid port with each of said control valves, and a check valve means associated with each respective control valve and operative when each of the control valves are in the flow preventing position for permitting fluid to flow in one direction only and from the bore via the fluid port and into one of said upper and lower chambers.

10. In a vehicle suspension system of the type including a frame, first and second wheel assemblies connected to the frame, a pendular U-shaped roll bar having a central section rotatably mounted to the frame and first and second reaction arms associated with a respective wheel assembly, and first and second links, respectively, connecting each respective wheel assembly with its associated reaction arm, said first link being rigid and axially extensible, and said second link being a hydraulic piston assembly including a piston mounted for axial reciprocating movement within the bore of a cylinder having axially spaced end closures and dividing said cylinder bore into upper and lower chambers, the improvement comprising:
  control valve means, including a fluid port associated with each end closure, for permitting and preventing fluid to communicate between the chambers;
  locking means for hydraulically locking said piston at a preselected location between the end closures and when said control valve is in said flow preventing position; and
  bypass means, operative independently of said valve means and when said piston has been displaced from said one preselected position, for permitting the piston to return to the preselected position when said valve means is in the flow preventing position, said bypass means including at least one bypass port located at said preselected location, said bypass port being blocked by said piston when said piston is at said preselected location and adapted to communicate with said chambers when said piston is displaced from said preslected location, a first bypass passage for communicating fluid between said bypass port and the fluid port in said upper end closure, and a second bypass passage for communicating fluid between said bypass port and the fluid port in said lower end closure, whereby when the piston is displaced from said preselected location and said valve is in said flow preventing position, fluid can pass through at least one of said bypass passages and around the piston and between the chambers.

11. The invention as recited in claim 10, further including check valve means associated with each said bypass passage for preventing fluid from communicating from one said chamber to the other of said chambers when said piston is displaced toward said one chamber, each check valve functioning to permit fluid flow in only on direction.

12. In a suspension for a vehicle having one sprung and two unsprung masses, a pendular anti-roll bar mounted to said sprung mass; a first and second axial link connecting said roll bar to one and the other of said unsprung masses, said first axial link being axially inextensible, said second axial link being axially extensible and comprising a hydraulic piston-cylinder assembly including a cylinder and a solid piston mounted for reciprocation in said cylinder, said piston having a nominal midstroke position that divides the cylinder into upper and lower chambers; passage means, eternally of the cylinder bore, for communicating fluid between said chambers; valve means, interposed in said passage means and having first and second positions, for permitting and preventing fluid from passing between the chambers, said first position permitting the piston to move between the upper and lower chambers; locking means for locking the piston in said cylinder at said midstroke position when said valve means is in said first position; and unlocking means, operable independently of said valve means, for permitting said piston to return to said midstroke position when said valve means is in said flow preventing position by permitting fluid to flow between said chambers and around said piston along a path that is independent of said passage means.

13. The invention as recited in claim 12 wherein said cylinder has opposite end walls, and said piston is carried by a piston rod including first and second rod portions, said rod portions extending from opposite axial faces of the piston into a respective chamber and protruding through a respective end wall.

14. The invention as recited in claim 13 wherein the areas of said opposite axial faces which work on the fluid are substantially the same.

* * * * *

UNITED STATES PATENT AND TRADEMARK OFFICE
CERTIFICATE OF CORRECTION

PATENT NO. : 5,217,245
DATED : June 8, 1993
INVENTOR(S) : Yoram Guy

It is certified that error appears in the above-indentified patent and that said Letters Patent is hereby corrected as shown below:

Column 5, line 25, "switcn" should be --switch--.

Column 5, line 62, "Without" should be --without--.

Column 7, line 22, "66" should be --66'--.

Column 7, line 48, after "two", delete ",".

Column 8, line 28, claim 1, "with" should be --within--.

Column 8, lines 58 - 59, claim 2, after "faces", delete "incompressible fluid in each chamber, the areas of said piston".

Column 10, line 49, claim 11, "on" should be --one--.

Column 10, line 60, claim 12, "eternally" should be --externally--.

Signed and Sealed this

Nineteenth Day of April, 1994

Attest:

BRUCE LEHMAN

*Attesting Officer*     *Commissioner of Patents and Trademarks*